United States Patent
Mehney et al.

[11] Patent Number: 6,039,344
[45] Date of Patent: Mar. 21, 2000

[54] VEHICLE OCCUPANT WEIGHT SENSOR APPARATUS

[75] Inventors: Mark A. Mehney, Commerce Township; Michael C. McCarthy, Birmingham; Michael G. Fullerton, Ypsilanti; Floyd J. Malecke, South Lyon, all of Mich.

[73] Assignee: TRW Inc., Lyndhurst, Ohio

[21] Appl. No.: 09/005,054

[22] Filed: Jan. 9, 1998

[51] Int. Cl.[7] .................................................. B60R 21/32
[52] U.S. Cl. ........................ 280/735; 73/781; 297/216.18
[58] Field of Search ..................... 280/734, 735; 297/216.1, 216.18; 73/781, 786; 324/109, 781

[56] References Cited

U.S. PATENT DOCUMENTS

| | | |
|---|---|---|
| 2,708,005 | 5/1955 | Gazzo . |
| 3,022,976 | 2/1962 | Zia ..................................... 297/216.18 |
| 3,766,344 | 10/1973 | Nevett . |
| 4,075,443 | 2/1978 | Fatur . |
| 5,232,243 | 8/1993 | Blackburn et al. . |
| 5,481,078 | 1/1996 | Asche . |
| 5,502,284 | 3/1996 | Meiller et al. . |
| 5,542,493 | 8/1996 | Jacobson et al. . |
| 5,573,269 | 11/1996 | Gentry et al. . |
| 5,739,757 | 4/1998 | Gioutsos ................................. 280/735 |
| 5,810,392 | 9/1998 | Gagnon ................................. 280/735 |

*Primary Examiner*—Eric Culbreth
*Attorney, Agent, or Firm*—Tarolli, Sundheim, Covell, Tummino & Szabo L.L.P.

[57] ABSTRACT

An apparatus (10) has a vehicle seat frame (30), a weight sensor apparatus (22, 22, 22, 22), and a vehicle occupant protection device (102) responsive to the weight sensor apparatus (22, 22, 22, 22). The seat frame (30) has a bottom portion (32) and a back portion (34) which together bear a vehicle occupant weight load. A deflectable seat cushion (38) covers the bottom portion (32) of the frame (30). The weight sensor apparatus (22, 22, 22, 22) measures the entire magnitude of the vehicle occupant weight load acting on the frame (30) independently of deflection of the cushion (38).

5 Claims, 2 Drawing Sheets

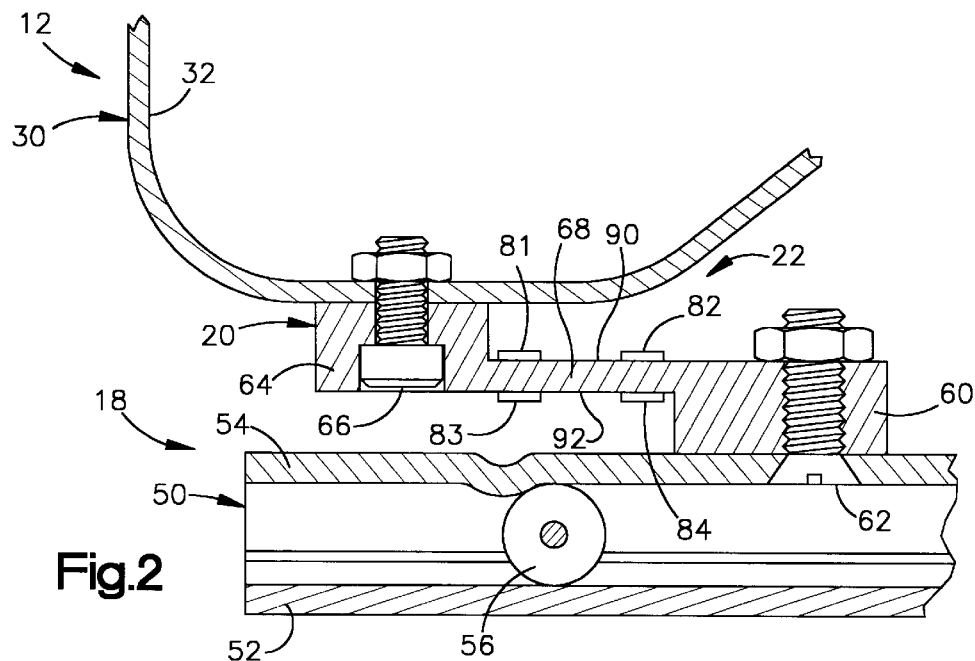
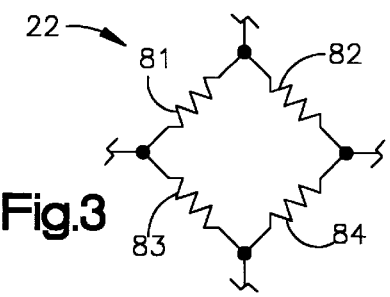
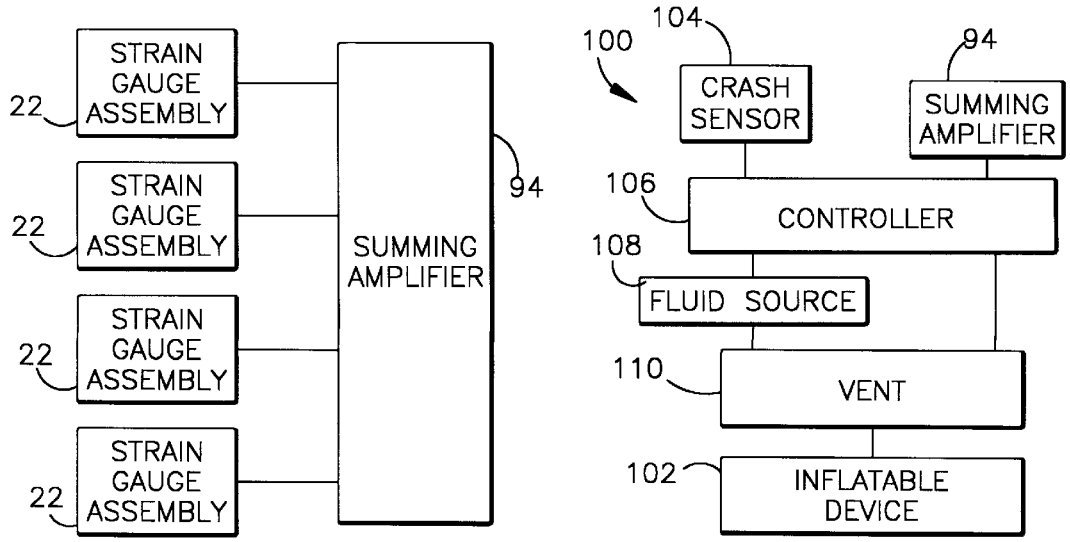

ശ്ശ1

VEHICLE OCCUPANT WEIGHT SENSOR APPARATUS

FIELD OF THE INVENTION

The present invention relates to an apparatus for sensing the weight of an occupant of a vehicle seat, and particularly relates to an apparatus for sensing the weight of the occupant and for deploying a vehicle occupant protection device in accordance with the weight of the occupant.

BACKGROUND OF THE INVENTION

U.S. Pat. No. 5,573,269 discloses an apparatus for sensing the weight of a vehicle occupant. The apparatus disclosed in the '269 patent includes an occupant weight sensor which is mounted in a vehicle seat. The weight sensor is operatively engaged with a deflectable seat cushion, and responds to deflection of the cushion under the influence of the weight of an occupant of the seat.

The apparatus disclosed in the '269 patent further includes an inflatable vehicle occupant protection device, a source of inflation fluid for inflating the protection device, and a controller. When the vehicle experiences a crash, the source of inflation fluid is actuated by the controller and directs inflation fluid into the protection device to inflate the protection device. The controller receives an output signal from the weight sensor at the seat cushion, and controls the amount of inflation fluid directed into the protection device in response to the output signal from the weight sensor. The inflation of the protection device is thus controlled in accordance with the sensed weight of the occupant of the seat.

SUMMARY OF THE INVENTION

In accordance with the present invention, an apparatus comprises a vehicle seat frame, a weight sensor apparatus, and a vehicle occupant protection device responsive to the weight sensor apparatus. The seat frame has a bottom portion and a back portion which together bear a vehicle occupant weight load. A deflectable seat cushion covers the bottom portion of the frame. The weight sensor apparatus measures the entire magnitude of the vehicle occupant weight load acting on the seat frame independently of deflection of the seat cushion.

In a preferred embodiment of the present invention, the apparatus further comprises a track structure which guides movement of the seat frame relative to the vehicle floor. The weight sensor apparatus is operatively interposed between the seat frame and the track structure. Specifically, the bottom portion of the seat frame comprises a generally rectangular seat pan. The frame is mounted on the track structure by four deflectable mounting members located beneath the four corners of the seat pan. In this arrangement, the entire magnitude of the occupant weight load acting on the seat frame is transmitted to the floor through the mounting members and the track assembly. The weight sensor apparatus comprises four strain gauge assemblies, each of which is operatively engaged with a corresponding one of the mounting members. A summing amplifier responds to the outputs of the strain gauge assemblies by providing an output indicative of the entire magnitude of the vehicle occupant weight load transmitted through the mounting members.

BRIEF DESCRIPTION OF THE DRAWINGS

The foregoing and other features of the present invention will become apparent to those skilled in the art upon reading the following description with reference to the accompanying drawings, wherein:

FIG. 2 is an enlarged, partly sectional view of parts shown in FIG. 2;

FIG. 3 is a partial view of an electrical circuit including parts shown in FIG. 2;

FIG. 4 is a block diagram of parts of the preferred embodiment of the present invention; and FIG. 5 is another block diagram of parts of the preferred embodiment.

DESCRIPTION OF A PREFERRED EMBODIMENT

Figure 1:
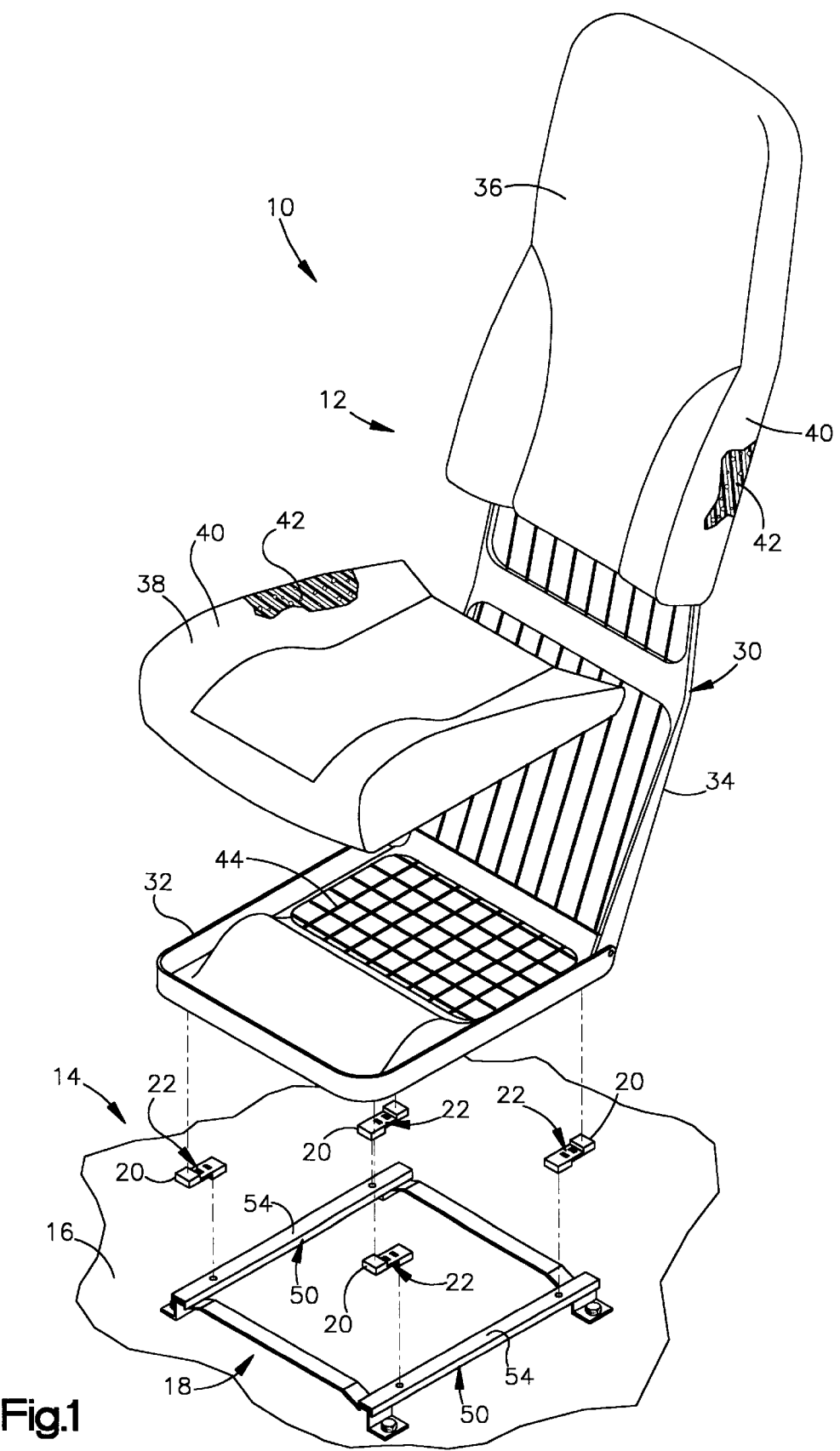
FIG. 1 is an exploded view of parts of a preferred embodiment of the present invention.

As shown partially in FIG. 1, an apparatus 10 comprising a preferred embodiment of the present invention includes a vehicle seat 12 and a support structure 14 which supports the seat 12 on a vehicle floor 16. The support structure 14 includes a track assembly 18 for guiding movement of the seat 12 relative to the floor 16. The support structure 14 further includes a plurality of seat mounting members 20 with corresponding strain gauge circuitry 22.

The seat 12 has a frame 30 with a bottom portion 32 and a back portion 34. The back portion 34 of the frame 30 is adjustably supported for inclination relative to the bottom portion 32 by a recliner assembly (not shown). Such a recliner assembly may be either motorized or manually operated, as known in the art.

A back cushion 36 covers the back portion 34 of the frame 30, and a bottom cushion 38 covers the bottom portion 32 of the frame 30. Each of the cushions 36 and 38 is a deflectable structure comprising an outer layer 40 on a compressible base 42. The outer layers 40 are preferably formed of fabric or leather. The bases 42 are preferably formed of elastomeric foam. As further known in the art, the bottom portion 32 of the frame 30, which may be referred to as a seat pan, includes a wire mesh spring bed 44 (shown schematically) for providing resilient support beneath the bottom cushion 38.

The track assembly 18 defines a pair of parallel tracks 50. Each track 50 includes a lower rail 52 (FIG. 2), an upper rail 54, and a plurality of rollers 56, one of which is shown in FIG. 2. The rollers 56 support the upper rails 54 for longitudinal movement relative to the lower rails 52.

The support structure 14 preferably has a total of four separate mounting members 20. Each mounting member 20 is located near an end of a corresponding upper rail 54 in the track assembly 18. The mounting members 20 are thus arranged in a rectangular array, with each mounting member 20 being located beneath a corresponding corner of the seat pan 32.

As shown in FIG. 2 with reference to one of the mounting members 20, each mounting member 20 in the preferred embodiment of the present invention is a unitary part consisting of a single, continuous body of metal such as steel or aluminum. A rigid lower base portion 60 of the mounting member 20 is fixed to the corresponding upper rail 54 by a fastener 62. A rigid upper base portion 64 of the mounting member 20 is fixed to the seat pan 32 by another fastener 66. A horizontally elongated, flexible intermediate portion 68 of the mounting member 20 interconnects the base portions 60 and 64. The mounting members 20 are thus arranged as fixed-fixed or S-type beams that mount the seat pan 32 on the upper rails 54. In this arrangement, the support structure 14, which includes the mounting members 20 and the track assembly 18, supports the entire weight of the seat 12 on the vehicle floor 16. More specifically, the mounting members 20 and the track assembly 18 bear the entire weight of the seat 12 in series between the seat 12 and the floor 16.

As further shown in FIG. 2, the strain gauge circuitry 22 on each mounting member 20 preferably comprises an assembly of four strain gauges 81, 82, 83 and 84 operatively mounted on the flexible portion 68 of the mounting member 20. The first and second strain gauges 81 and 82 are mounted on an upper surface 90 of the flexible portion 68 near its opposite ends. The third and fourth strain gauges 83 and 84 are similarly mounted on a lower surface 92 of the flexible portion 68 at locations directly beneath the first and second strain gauges 81 and 82.

When a vehicle occupant sits on the seat 12, an occupant weight load is transmitted through the cushions 36 and 38 to the frame 30. Since the occupant's feet normally rest on the floor, the occupant weight load acting on the frame 30 is normally less than the occupant's actual weight. However, the entire magnitude of the occupant weight load acting on the frame 30 is transmitted from the seat pan 32 to the floor 16 through the mounting members 20 and the track assembly 18. This causes the flexible portions 68 of the mounting members 20 to bend into S-shaped configurations. The first and fourth strain gauges 81 and 84 on each flexible portion 68 are then placed in compression. The second and third strain gauges 82 and 83 are simultaneously placed in tension. The two pairs 81, 84 and 82, 83 of strain gauges on each mounting member 20 thus respond differently to bending of the corresponding flexible portion 68. The four strain gauges 81–84 on each mounting member 20 are connected electrically in a Wheatstone bridge configuration (FIG. 3) which develops an output as a function of that difference in response. Accordingly, the output of each strain gauge assembly 22 indicates the amount of bending of the flexible portion 68 of the corresponding mounting member 20 under the portion of the vehicle occupant weight load that is transmitted through that mounting member 20. The strain gauges 81–84 and the circuitry for providing outputs in this manner may be of any suitable construction known in the art.

A summing amplifier 94 (FIG. 4) processes the outputs of the four strain gauge assemblies 22 to provide an output indicating the entire magnitude of the vehicle occupant weight load acting on the seat 12. Since the strain gauge assemblies 22 are located beneath the four corners of the seat pan 32, the output of the summing amplifier 94 in the preferred embodiment of the invention accurately indicates the entire magnitude of the vehicle occupant weight load regardless of the occupant's position on the seat 12.

The output signal of the summing amplifier 94 can be used in accordance with the present invention to control deployment of one or more vehicle occupant protection devices. For example, as shown schematically in FIG. 5, the summing amplifier 94 is included in a deployment system 100 with an inflatable vehicle occupant protection device 102. The deployment system 100 further includes a crash sensor 104, a controller 106, and a source 108 of inflation fluid. A vent 110 is interposed between the source 108 of inflation fluid and the inflatable device 102.

The inflatable device 102 can be any one of several different types of inflatable vehicle occupant protection devices known in the art. Such devices include air bags, inflatable seat belts, inflatable knee bolsters, inflatable head liners or side curtains, and knee bolsters operated by air bags.

The crash sensor 104 may comprise any known apparatus for sensing a vehicle condition that indicates the occurrence of a crash. Such a vehicle condition may comprise sudden deceleration, crushing of a side portion of the vehicle, a vehicle rollover, or the like. If the crash-indicating condition is at or above a predetermined threshold level, it indicates the occurrence of a crash for which deployment of the inflatable device 102 is desired to help protect an occupant of the seat 12. The crash sensor 104 then provides a deployment signal to the controller 106.

When the controller 106 receives a deployment signal from the crash sensor 104, it responds by actuating the fluid source 108 to initiate inflation of the inflatable device 102. The controller 106 also responds to the output of the summing amplifier 94. If the output of the summing amplifier 94 indicates that the weight of the occupant is relatively low, the controller 106 causes the vent 100 to direct a first amount of inflation fluid away from the inflatable device 102. The inflatable device 102 is then deployed in a first mode for protection of a relatively light weight occupant. If the output of the summing amplifier 94 indicates that the weight of the occupant is relatively high, the controller 106 causes the vent 110 to direct a second, lesser amount of inflation fluid away from the inflatable device 102. The inflatable device 102 is then deployed in a second, different mode for protection of a heavier occupant.

In accordance with another feature of the present invention, the strain gauge assemblies 22 can be used to indicate the position as well as the weight of an occupant of the seat 12. For example, the outputs of the strain gauge assemblies 22 beneath the forward corners of the seat 12 can be compared with the outputs of the those beneath the rear corners of the seat 12 to determine if the occupant is out-of-position in a forward direction. A vehicle occupant protection device could then be deployed in a mode selected for the out-of-position occupant.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:

a vehicle seat frame;

a plurality of deflectable mounting structures which together bear the entire weight of said frame;

a plurality of vehicle occupant weight sensor assemblies, each of said weight sensor assemblies comprising a strain gauge mounted on a corresponding one of said deflectable mounting structures; and a vehicle occupant protection device responsive to said weight sensor assemblies.

2. Apparatus as defined in claim 1 wherein said deflectable mounting structures support said frame on a track structure which guides movement of said frame.

3. Apparatus as defined in claim 2 further comprising a deflectable seat cushion on said frame.

4. Apparatus comprising:

a vehicle seat frame having a bottom portion and a back portion which together bear a vehicle occupant weight load;

a support structure which bears the entire weight of said frame and the entire magnitude of said occupant weight load, said support structure including a weight sensor apparatus which measures said entire magnitude of said occupant weight load; and a vehicle occupant protection device responsive to said weight sensor apparatus, said support structure including a pair of tracks which guide movement of said frame, said weight sensor apparatus comprising a plurality of weight sensor assemblies which measure portions of said occupant weight load acting on said tracks, said weight sensor assemblies being operatively interposed between said frame and said tracks, each of said weight sensor assemblies comprising a strain gauge mounted on a corresponding deflectable portion of said support structure.

5. Apparatus as defined in claim 4 further comprising a deflectable seat cushion covering said bottom portion of said frame.

* * * * *